(12) United States Patent
Kouyama et al.

(10) Patent No.: US 9,148,633 B2
(45) Date of Patent: Sep. 29, 2015

(54) IMAGING APPARATUS AND METHOD OF CALCULATING COLOR TEMPERATURE

(71) Applicant: Panasonic Corporation, Osaka (JP)

(72) Inventors: Shinzou Kouyama, Osaka (JP); Kazutoshi Onozawa, Osaka (JP); Yoshihisa Kato, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 67 days.

(21) Appl. No.: 13/708,026

(22) Filed: Dec. 7, 2012

(65) Prior Publication Data
US 2013/0093929 A1 Apr. 18, 2013

Related U.S. Application Data

(63) Continuation of application No. PCT/JP2011/001023, filed on Feb. 23, 2011.

(30) Foreign Application Priority Data

Jul. 6, 2010 (JP) .................. 2010-154378

(51) Int. Cl.
H04N 9/09 (2006.01)
H04N 9/73 (2006.01)
H04N 9/04 (2006.01)

(52) U.S. Cl.
CPC .................. *H04N 9/09* (2013.01); *H04N 9/045* (2013.01); *H04N 9/735* (2013.01)

(58) Field of Classification Search
CPC ......... H04N 9/09; H04N 9/735; H04N 9/045; H04N 5/33

USPC ........................................ 348/273, 223.1, 244
See application file for complete search history.

(56) References Cited

U.S. PATENT DOCUMENTS

| | | | |
|---|---|---|---|
| 5,099,313 A | 3/1992 | Suemoto et al. | |
| 5,319,449 A | 6/1994 | Saito et al. | |
| 7,170,046 B2 | 1/2007 | Higashitsutsumi | |
| 2002/0106206 A1* | 8/2002 | Takeshita | 396/429 |
| 2005/0088537 A1* | 4/2005 | Nakamura et al. | 348/223.1 |
| 2005/0133690 A1* | 6/2005 | Higashitsutsumi | 250/208.1 |
| 2006/0188155 A1* | 8/2006 | Matsuyama | 382/167 |

(Continued)

FOREIGN PATENT DOCUMENTS

| | | |
|---|---|---|
| JP | 2-29095 | 1/1990 |
| JP | 5-7369 | 1/1993 |

(Continued)

OTHER PUBLICATIONS

International Search Report issued May 31, 2011 in International Application No. PCT/JP2011/001023.

*Primary Examiner* — Nicholas Giles
*Assistant Examiner* — Abdelaaziz Tissire
(74) *Attorney, Agent, or Firm* — Wenderoth, Lind & Ponack, L.L.P.

(57) ABSTRACT

A control unit calculates the color temperature using at least a first visible light signal and a near-infrared signal when the amount of the near-infrared signal is larger than a predetermined amount. The first visible light signal is a signal generated by photoelectrically converting visible light. The near-infrared signal is a signal generated by photoelectrically converting near-infrared light.

12 Claims, 10 Drawing Sheets

(56) References Cited

U.S. PATENT DOCUMENTS

| | | | |
|---|---|---|---|
| 2008/0049115 A1* | 2/2008 | Ohyama et al. | 348/222.1 |
| 2010/0039528 A1* | 2/2010 | Ogasahara et al. | 348/223.1 |
| 2011/0249157 A1* | 10/2011 | Fredembach et al. | 348/273 |
| 2012/0026357 A1* | 2/2012 | Katagairi et al. | 348/223.1 |
| 2012/0113294 A1* | 5/2012 | Oyabu et al. | 348/223.1 |
| 2013/0083157 A1* | 4/2013 | Kamon et al. | 348/33 |

FOREIGN PATENT DOCUMENTS

| | | |
|---|---|---|
| JP | 5-292533 | 11/1993 |
| JP | 2000-184382 | 6/2000 |
| JP | 2001-78204 | 3/2001 |
| JP | 2003-163944 | 6/2003 |
| JP | 4286123 | 6/2009 |

* cited by examiner

IMAGING APPARATUS AND METHOD OF CALCULATING COLOR TEMPERATURE

CROSS REFERENCE TO RELATED APPLICATIONS

This is a continuation application of PCT Patent Application No. PCT/JP2011/001023 filed on Feb. 23, 2011, designating the United States of America, which is based on and claims priority of Japanese Patent Application No. 2010-154378 filed on Jul. 6, 2010. The entire disclosures of the above-identified applications, including the specifications, drawings and claims are incorporated herein by reference in their entirety.

FIELD

The present invention relates to an imaging apparatus and a method of calculating a color temperature using visible light and near-infrared light.

BACKGROUND

Cameras (imaging apparatuses) including a color solid-state imaging device that can receive visible light and near-infrared light simultaneously are expected as cameras that can photograph at any time of day or night. In the camera using such a color solid-state imaging device conventionally, a visible light signal (R, G, and B signals) is obtained by separating a near-infrared component (signal) contained in the visible light signal using a difference operation or the like.

Subsequently, in the camera, a color temperature is calculated according to a technique of calculating (detecting) a color temperature using a visible light signal (R, G, and B signals) (hereinafter, referred to as Related Art A) as described in PLT 1 or PLT 2. The cameras described in PLT 1 and PLT 2 include an imaging device that can process only the R, G, and B signals.

CITATION LIST

Patent Literature

PLT 1: Japanese Patent Application Laid-Open No. 5-292533
PLT 2: Japanese Patent Application Laid-Open No. 5-007369

SUMMARY

Technical Problem

In Related Art A, however, when the received light has a low color temperature, the intensity of the blue light in the received light is extremely lower than the intensity of the red light and that of the green light. For this reason, accuracy of the color temperature to be calculated is significantly reduced. Namely, the accuracy in calculation of the color temperature is significantly reduced depending on the state of the visible light.

The present invention has been made in order to solve the problem above. An object of the present invention is to provide an imaging apparatus that can suppress reduction in accuracy in calculation of a color temperature.

Solution to Problem

In order to solve the problem, an imaging apparatus according to one embodiment of the present invention includes: an imaging device that receives visible light and near-infrared light; and a calculation unit configured to calculate a color temperature, wherein the imaging device includes: a first photoelectric converting element that photoelectrically converts visible light transmitted through a first color filter to generate a first visible light signal as a visible light signal, the first color filter transmitting at least the visible light; and a second photoelectric converting element photoelectrically converts near-infrared light transmitted through a second color filter to generate a near-infrared signal, the second color filter transmitting at least the near-infrared light, and the calculation unit calculates the color temperature using at least the first visible light signal and the near-infrared signal when an amount of the near-infrared signal is larger than a predetermined amount.

It is emphatically noted that the calculation unit calculates the color temperature using at least the first visible light signal and the near-infrared signal when the amount of the near-infrared signal is larger than the predetermined amount. The first visible light signal is a signal generated by photoelectrically converting the visible light. The near-infrared signal is a signal generated by photoelectrically converting the near-infrared light.

As the light has a lower color temperature, the light has a larger amount of near-infrared light. Accordingly, when the received light has a low color temperature, the amount of the near-infrared signal is larger. For this reason, the color temperature is calculated using the near-infrared light (near-infrared signal). Namely, reduction in accuracy in calculation of the color temperature can be suppressed irrespective of the state of the visible light received by the imaging device.

Moreover, preferably, the calculation unit calculates a first ratio as a ratio of the near-infrared signal to the first visible light signal when the amount of the near-infrared signal is larger than the predetermined amount, and calculates the color temperature using the first ratio and a comparison table showing information for calculating a color temperature corresponding to the first ratio.

Moreover, preferably, the calculation unit calculates a first difference as a difference between the first visible light signal and the near-infrared signal when the amount of the near-infrared signal is larger than the predetermined amount, and calculates the color temperature using the first difference and a comparison table showing information for calculating a color temperature corresponding to the first difference.

Moreover, preferably, the visible light transmitted through the first color filter is light of a red component, and the first visible light signal is a red-light signal.

Moreover, preferably, the imaging device further includes a third photoelectric converting element that photoelectrically converts visible light transmitted through a third color filter to generate a second visible light signal as a visible light signal, the third color filter transmitting the visible light having a wavelength different from a wavelength of the visible light transmitted by the first color filter, and the calculation unit calculates the color temperature using at least two of the first visible light signal, the second visible light signal, and the near-infrared signal.

Moreover, preferably, the calculation unit calculates the first ratio as the ratio of the near-infrared signal to the first visible light signal when the amount of the near-infrared signal is larger than the predetermined amount, and calculates a second ratio as a ratio of the first visible light signal to the second visible light signal when the amount of the near-infrared signal is not more than the predetermined amount, and the calculation unit calculates the color temperature using the calculated ratio among the first ratio and the second ratio and a comparison table showing information for calculating a color temperature corresponding to the calculated ratio.

Moreover, preferably, the calculation unit calculates a first difference as a difference between the first visible light signal and the near-infrared signal when the amount of the near-infrared signal is larger than the predetermined amount, and calculates a second difference as a difference between the first visible light signal and the second visible light signal when the amount of the near-infrared signal is not more than the predetermined amount, and the calculation unit calculates the color temperature using the calculated difference among the first difference and the second difference and a comparison table showing information for calculating a color temperature corresponding to the calculated difference.

Moreover, preferably, the visible light transmitted through the first color filter is light of a red component, the visible light transmitted through the third color filter is light of a green component, the first visible light signal is a red-light signal, and the second visible light signal is a green-light signal.

A method of calculating a color temperature according to one embodiment of the present invention is executed by an imaging apparatus including an imaging device for receiving visible light and near-infrared light. The imaging device includes: a first photoelectric converting element that photoelectrically converts visible light transmitted through a first color filter to generate a first visible light signal as a visible light signal, the first color filter transmitting at least the visible light; and a second photoelectric converting element that photoelectrically converts near-infrared light transmitted through a second color filter to generate a near-infrared signal, the second color filter transmitting at least the near-infrared light, the method of calculating a color temperature, comprising calculating the color temperature using at least the first visible light signal and the near-infrared signal when an amount of the near-infrared signal is larger than a predetermined amount.

In the present invention, a plurality of components that forms such an imaging apparatus may be entirely or partially implemented as a system large scale integration (LSI).

Moreover, in the present invention, the steps included in the method of calculating a color temperature may be implemented as a program for causing a computer to execute the steps. Alternatively, in the present invention, the steps included in the method of calculating a color temperature may be implemented as a computer-readable recording medium that stores such a program. Further, the program may be delivered via a transmission medium such as the Internet.

Advantageous Effects

The present invention can suppress reduction in accuracy in calculation of the color temperature.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

Figure 1:
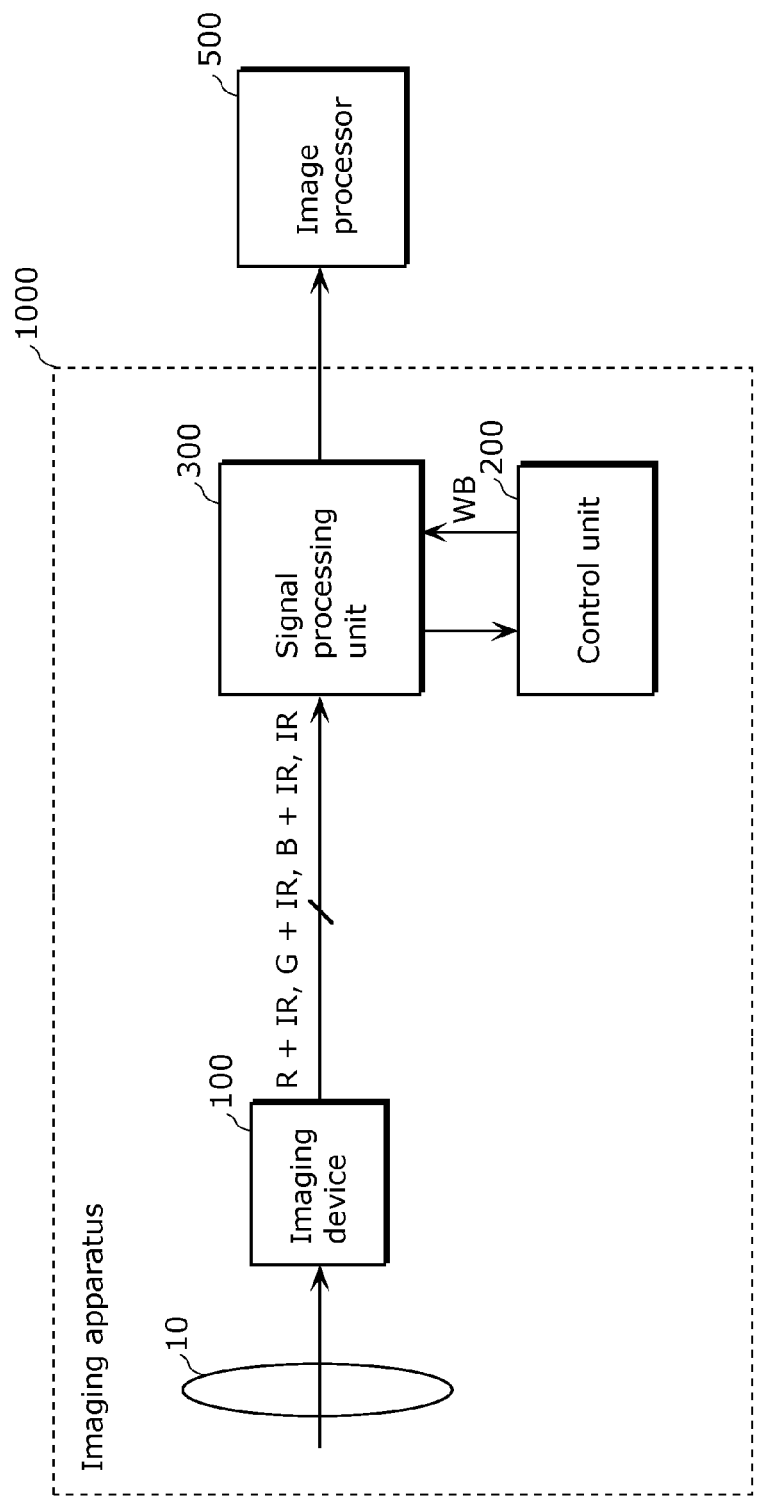
FIG. 1 is a block diagram showing a configuration of an imaging apparatus according to the embodiment.

Hereinafter, embodiments according to the present invention will be described with reference to the drawings. Same reference numerals will be given to same parts in the description below. The parts given the same reference numerals have the same name and function. Accordingly, detailed description will be not repeated.

Embodiment

FIG. 1 is a block diagram showing a configuration of an imaging apparatus 1000 according to the embodiment. In FIG. 1, an image processor 500 is also shown for description although the image processor 500 is not included in the imaging apparatus 1000. The image processor 500 is a device that executes various image processings.

The imaging apparatus 1000 can be used day and night, and generate a color image and a monochrome image. The imaging apparatus 1000 is a digital video camera that can take a moving picture. Alternatively, the imaging apparatus 1000 may be a digital still camera that can take a still picture.

The imaging apparatus 1000 includes a lens 10, an imaging device 100, a control unit 200, and a signal processing unit 300.

The imaging device 100 is a complementary metal oxide semiconductor (CMOS) image sensor (solid-state imaging device). The imaging device 100 is not limited to the CMOS image sensor, and may be a charge coupled device (CCD) image sensor, for example.

The imaging device 100 is configured to receive visible light and near-infrared light.

The control unit 200 is a micro processing unit (MPU). The control unit 200 is not limited to the MPU. Other operation circuit may be used as long as the operation circuit has an operating function.

Figure 2:
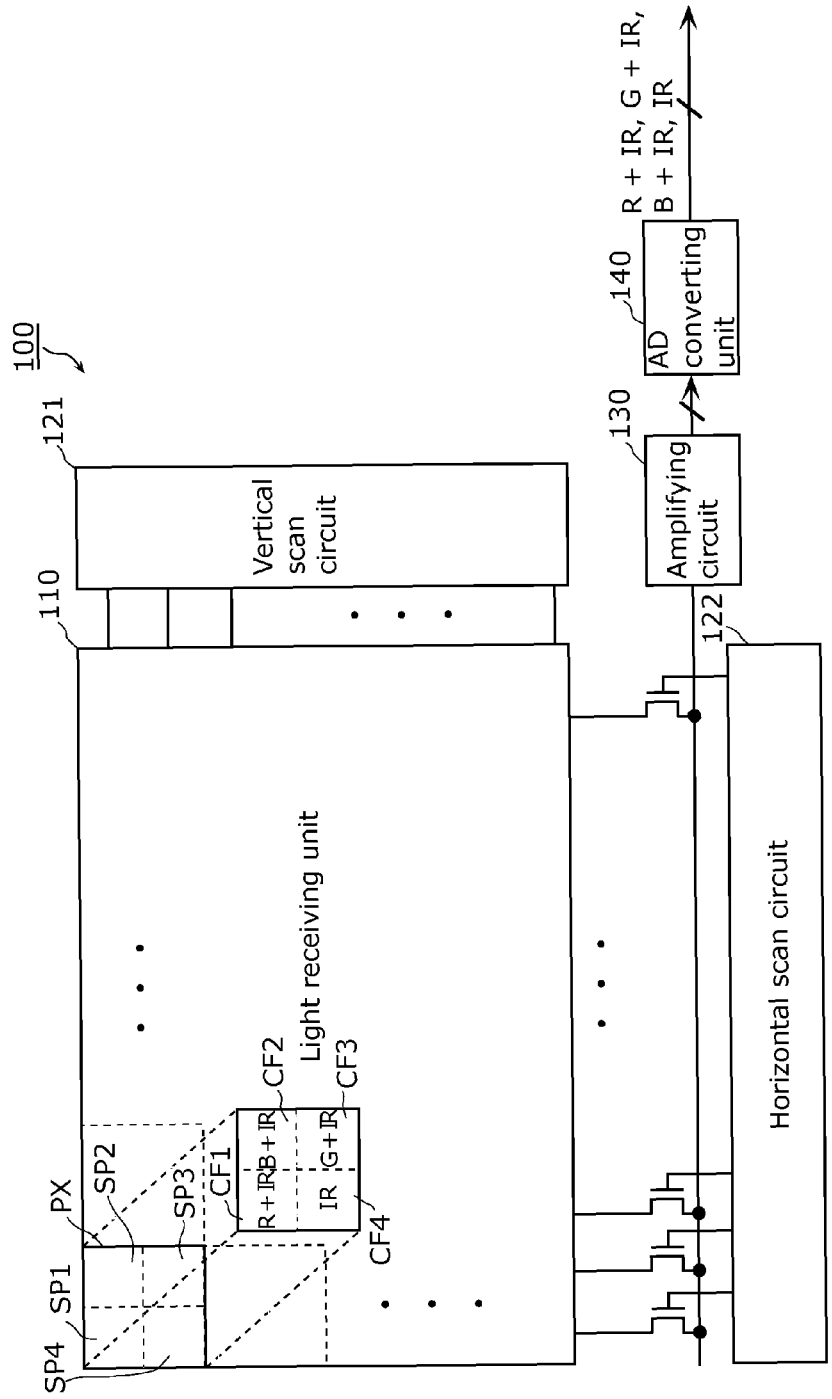
FIG. 2 is a block diagram showing a configuration of an imaging device.

FIG. 2 is a block diagram showing a configuration of the imaging device 100.

Referring to FIG. 2, the imaging device 100 includes a light receiving unit 110, a vertical scan circuit 121, a horizontal scan circuit 122, an amplifying circuit 130, and an AD converting unit 140.

The light enters the light receiving unit 110. The light entering the lens 10 shown in FIG. 1 forms an image in the light receiving unit 110. The light receiving unit 110 has m (m=an integer of 4 or more) of pixels PXs arranged in a matrix. For example, when the imaging apparatus 1000 is an apparatus that generates an image of 10,000,000 pixels, m is 10,000,000.

In m of pixels PXs, each pixel has photoelectric converting elements SP1, SP2, SP3, and SP4 as a subpixel. Namely, the imaging device 100 has the photoelectric converting elements SP1, SP2, SP3, and SP4.

Each of the photoelectric converting elements SP1, SP2, SP3, and SP4 photoelectrically converts the entering light to generate a signal (hereinafter, referred to as a photoelectrically converted signal). Each of the photoelectric converting elements SP1, SP2, SP3, and SP4 is a photodiode as a light-receiving element.

A color filter CF1 is formed on the photoelectric converting element SP1. The color filter CF1 transmits the light of a red component as the visible light (hereinafter, referred to the red light) and near-infrared (near infrared radiation) light. Hereinafter, the near-infrared light is also expressed as IR light.

The red light and the IR light transmit through the color filter CF1, and enter the photoelectric converting element SP1. The photoelectric converting element SP1 generates a photoelectrically converted signal (hereinafter, referred to as a first photoelectrically converted signal) according to the intensity of the entered red light and IR light.

Hereinafter, a signal of the red component is referred to as an R signal. Hereinafter, the signal of the IR light component is referred to as an IR signal. The IR signal is a near-infrared signal. The first photoelectrically converted signal includes the R signal as a visible light signal and the IR signal. Namely, the first photoelectrically converted signal is a visible light signal. Here, the visible light signal is a signal of the visible light component. Hereinafter, the first photoelectrically converted signal is also referred to as an R+IR signal.

A color filter CF2 is formed on the photoelectric converting element SP2. The color filter CF2 transmits the light of a blue component as the visible light (hereinafter, referred to as the blue light) and the IR light.

The blue light and the IR light transmit through the color filter CF2, and enter the photoelectric converting element SP2. The photoelectric converting element SP2 generates a photoelectrically converted signal (hereinafter, referred to as a second photoelectrically converted signal) according to the intensity of the entered blue light and IR light.

Hereinafter, a signal of the blue component is referred to as a B signal. The second photoelectrically converted signal includes the B signal as a visible light signal and the IR signal. Namely, the second photoelectrically converted signal is a visible light signal. Hereinafter, the second photoelectrically converted signal is also referred to as a B+IR signal.

A color filter CF3 is formed on the photoelectric converting element SP3. The color filter CF3 transmits the light of a green component as the visible light (hereinafter, referred to as the green light) and the IR light.

The green light and the IR light transmit the color filter CF3, and enter the photoelectric converting element SP3. The photoelectric converting element SP3 generates a photoelectrically converted signal (hereinafter, referred to as a third photoelectrically converted signal) according to the intensity of the entered green light and IR light.

Hereinafter, a signal of the green component is referred to as a G signal. The third photoelectrically converted signal includes the G signal as a visible light signal and the IR signal. Namely, the third photoelectrically converted signal is a visible light signal. Hereinafter, the third photoelectrically converted signal is also referred to as a G+IR signal.

The R signal, the G signal, and the B signal are visible light signals. Hereinafter, the R signal, the G signal, and the B signal are also referred to as a red-light signal, a green-light signal, and a blue-light signal, respectively.

A color filter CF4 is formed on the photoelectric converting element SP4. The color filter CF4 transmits only the IR light.

The IR light transmits through the color filter CF4, and enters the photoelectric converting element SP4. The photoelectric converting element SP4 generates a photoelectrically converted signal (hereinafter, referred to as a fourth photoelectrically converted signal) according to the intensity of the entered IR light. The fourth photoelectrically converted signal is a near-infrared signal including only a signal of a near-infrared light component (IR signal). Hereinafter, the fourth photoelectrically converted signal is also referred to as an IR signal.

Each of the photoelectric converting elements SP1, SP2, and SP3 is a first photoelectric converting element or a third photoelectric converting element. The photoelectric converting element SP4 is a second photoelectric converting element.

The first photoelectric converting element photoelectrically converts the visible light transmitted through the first color filter that transmits at least the visible light, to generate a first visible light signal as a visible light signal. The first color filter is the color filters CF1, CF2, and CF3.

The second photoelectric converting element photoelectrically converts the near-infrared light transmitted through the second color filter that transmits at least the near-infrared light, to generate a near-infrared signal. The second color filter is the color filter CF4. The second photoelectric converting element is the photoelectric converting element SP4.

The third photoelectric converting element photoelectrically converts the visible light transmitted through the third color filter to generate a second visible light signal as a visible light signal. The third color filter transmits the visible light having a wavelength different from that of the visible light to be transmitted through the first color filter.

Here, as an example, suppose that the first color filter is the color filter CF1 and the third color filter is the color filter CF3. In this case, the first photoelectric converting element is the photoelectric converting element SP1, and the third photoelectric converting element is the photoelectric converting element SP3. In this case, the visible light transmitted through the first color filter is the light of the red component, and the first visible light signal is the red-light signal. In this case, the visible light transmitted through the third color filter is the light of the green component, and the second visible light signal is the green-light signal.

As above, the plurality of pixels having sensitivity to the visible light to the near-infrared light is arranged in the light receiving unit 110.

The arrangement of the color filters CF1, CF2, CF3, and CF4 is not limited to the arrangement shown in FIG. 2. Namely, the color filter CF1 does not need to be arranged in a diagonal relationship to the color filter CF3.

For example, the color filter CF1 and the color filter CF3 are arranged so as to be aligned in the vertical direction or the horizontal direction.

A vertical scan circuit 121 and a horizontal scan circuit 122 cooperate to read the photoelectrically converted signals generated by the corresponding photoelectric converting elements SP1, SP2, SP3, and SP4 included in each pixel PX.

The vertical scan circuit 121 and the horizontal scan circuit 122 execute a processing to sequentially read the first to fourth photoelectrically converted signals generated by the corresponding photoelectric converting elements SP1, SP2, SP3, and SP4 (hereinafter, referred to as a signal read processing). The signal read processing is a known processing to read a signal in the CMOS image sensor, and the detailed description thereof will be omitted.

Every time when the vertical scan circuit 121 and the horizontal scan circuit 122 execute the signal read processing to read one photoelectrically converted signal, the read photoelectrically converted signal (for example, the first photoelectrically converted signal) is transmitted to an amplifying circuit 130.

The amplifying circuit 130 executes a processing to amplify the signal level of the photoelectrically converted signal. Every time when the amplifying circuit 130 receives the photoelectrically converted signal, the amplifying circuit 130 amplifies the signal level of the received photoelectrically converted signal and transmits the photoelectrically converted signal to an AD converting unit 140.

When the signal read processing is executed, the amplifying circuit 130 sequentially receives the first to fourth photoelectrically converted signals. Subsequently, the amplifying circuit 130 transmits the first to fourth photoelectrically converted signals after amplification sequentially to the AD converting unit 140.

The first to fourth photoelectrically converted signals form a set of photoelectrically converted signals. Namely, the R+IR signal, the G+IR signal, the B+IR signal, and the IR signal form a set of photoelectrically converted signals. As described above, each of the first to third photoelectrically converted signals includes the visible light signal. Namely, the set of photoelectrically converted signals is composed of the three visible light signals and the IR signal (near-infrared signal).

The vertical scan circuit 121 and the horizontal scan circuit 122 repeatedly execute the signal read processing m times to read all the signals corresponding to one frame. In this case, every time when the signal read processing is executed, the amplifying circuit 130 transmits one set of m sets of the photoelectrically converted signals after amplification in order to the AD converting unit 140.

Every time when the AD converting unit 140 receives one set of the photoelectrically converted signals, the AD converting unit 140 converts each of the four photoelectrically converted signals, which form the received set of the photoelectrically converted signals, into a digital signal of an s (natural number) bit.

Every time when the AD converting unit 140 receives one set of the photoelectrically converted signals, the AD converting unit 140 transmits the set of the photoelectrically converted signals to a signal processing unit 300, the set of the photoelectrically converted signals being composed of the four photoelectrically converted signals converted into the digital signals. Here, for example, suppose that the AD converting unit 140 converts each of the photoelectrically converted signals into an 8-bit digital signal. In this case, each of the photoelectrically converted signals converted into the digital signals is a signal indicating a value in the range of 0 to 255.

In the present embodiment, as the digital signal indicates a larger value, the amount of the component corresponding to the digital signal is larger. For example, as the digital IR signal converted by the AD converting unit 140 indicates a larger value, the amount of the near-infrared light component is larger.

The AD converting unit 140 transmits one set of m sets of the photoelectrically converted signals after conversion in order to the signal processing unit 300.

When a moving picture is taken by the imaging apparatus 1000, the processing to transmit the m sets of the photoelectrically converted signals after conversion to the signal processing unit 300 is repeatedly executed by the AD converting unit 140.

Hereinafter, a processing to generate an image taken by the imaging device 100 is referred to as an image generation processing.

Figure 3:
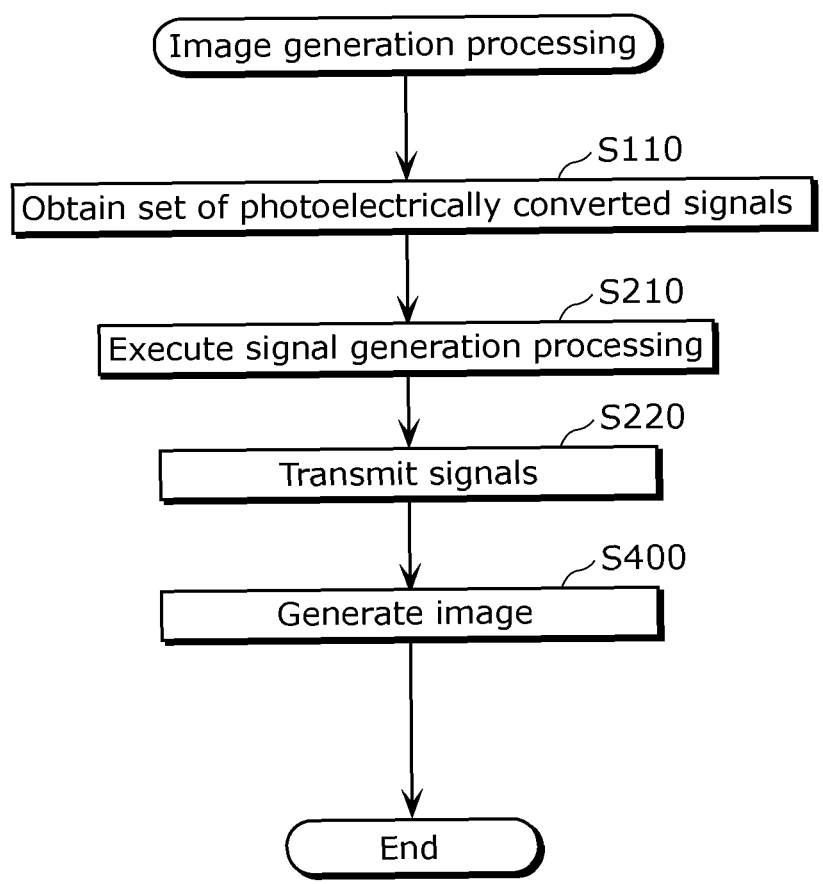
FIG. 3 is a flowchart of an image generation processing.

FIG. 3 is a flowchart of the image generation processing. The image generation processing is executed by the signal processing unit 300 and the image processor 500.

Again, referring to FIG. 1, the signal processing unit 300 receives one set of the m sets of the photoelectrically converted signals in order from the imaging device 100 (S110).

Although the details will be described later, every time when the signal processing unit 300 receives one set of the photoelectrically converted signals, the signal processing unit 300 generates the R, G, and B signals using the received set of the photoelectrically converted signals (S210).

Using the R, G, and B signals, the image processor 500 generates an image (frame) (S400). Namely, the image processor 500 executes an image processing.

When a moving picture is taken by the imaging apparatus 1000, the image generation processing in FIG. 3 is repeatedly executed.

Next, the configuration of the signal processing unit 300 will be described.

Figure 4:
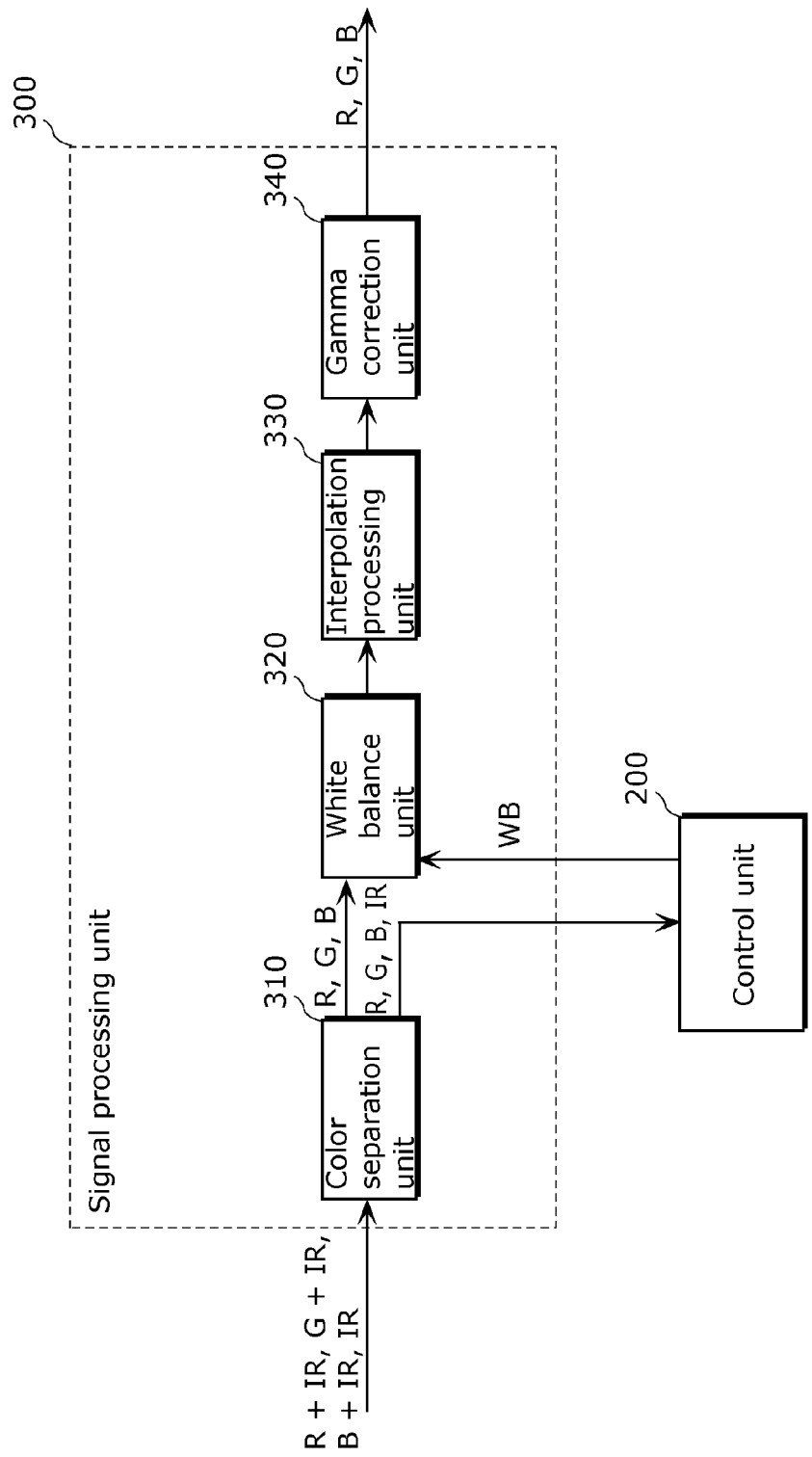
FIG. 4 is a block diagram showing a configuration of a signal processing unit according to the embodiment.

FIG. 4 is a block diagram showing the configuration of the signal processing unit 300 according to the embodiment. In FIG. 4, the control unit 200 is shown for description although the control unit 200 is not included in the signal processing unit 300.

Referring to FIG. 4, the signal processing unit 300 includes a color separation unit 310, a white balance unit 320, an interpolation processing unit 330, and a gamma correction unit 340.

The color separation unit 310 executes a signal separation processing, which will be described later in detail.

The white balance unit 320 adjusts white balance, which will be described later in detail.

The interpolation processing unit 330 executes an interpolation processing, which will be described later in detail.

The gamma correction unit 340 executes a gamma correction processing, which will be described later in detail.

Next, processings executed by the signal processing unit 300 will be described.

The signal processing unit 300 executes a processing in Step S110, a signal generation processing in Step S210, and a processing in Step S220 in FIG. 3.

From the imaging device 100, the color separation unit 310 receives one set of the m sets of the photoelectrically converted signals in order (S110). One set of the photoelectrically converted signals is composed of the R+IR signal, the G+IR signal, the B+IR signal, and the IR signal.

In the signal generation processing in Step S210, first, every time when the color separation unit 310 receives one set of the photoelectrically converted signals, the signal separation processing is executed. In the signal separation processing, the color separation unit 310 generates the R signal, the G signal, and the B signal as a digital signal using the R+IR signal, the G+IR signal, the B+IR signal, and generates the IR signal as the digital signal, these four signals forming the one set of the photoelectrically converted signals.

Specifically, the color separation unit 310 multiplies each of the R+IR signal, the G+IR signal, and the B+IR signal by a color separation correction matrix to separate the signal to be multiplied into the visible light signal (R, G, or B signal) and the IR signal (near-infrared signal).

Here, the color separation correction matrix is a matrix for separating a signal including the visible light signal and the near-infrared signal (for example, R+IR signal) into a visible light signal and an IR signal (near-infrared signal). The color separation correction matrix is also a matrix for correcting the spectrum or the like in an actual device. The color separation correction matrix is also a matrix calculated from the spectral characteristics of the imaging device 100.

For example, the color separation unit 310 multiplies the R+IR signal by the color separation correction matrix to separate the R+IR signal into the R signal and the IR signal (near-infrared signal). The G+IR signal and the B+IR signal are separated in the same manner as in the case of the R+IR signal.

Hereinafter, the R signal, the G signal, the B signal, and the IR signal as the digital signal are referred to as an R value, a G value, a B value, and an IR value, respectively.

The processing to separate a signal into a visible light signal and a near-infrared signal is not limited to the processing above. For example, the color separation unit 310 may subtract the value indicated by the IR signal from the value indicated by the R+IR signal and generate a signal indicating the obtained value as the R signal.

In this case, the G signal and the B signal are generated in the same manner as in the case of the R signal. Namely, each of the R+IR signal, the G+IR signal, and the B+IR signal is separated into a visible light signal (for example, R signal) and an IR signal (near-infrared signal).

The color separation unit 310 transmits the R, G, and B signals to the white balance unit 320, and transmits the R, G, B, and IR signals to the control unit 200. Thereby, the signal separation processing is completed.

The color separation unit 310 repeatedly executes the signal separation processing m times. Thereby, m sets of the R, G, and B signals are transmitted to the white balance unit 320, and m sets of the R, G, B, and IR signals are transmitted to the control unit 200.

Every time when the white balance unit 320 receives the m sets of R, G, and B signals corresponding to one frame, the white balance unit 320 performs the white balance adjustment processing on the received m sets of R, G, and B signals corresponding to one frame using a white balance coefficient WB transmitted from the control unit 200 and described later, and transmits the R, G, and B signals after the processing to the interpolation processing unit 330. The white balance adjustment processing is a known processing, and the detailed description thereof will be omitted.

Every time when the interpolation processing unit 330 receives the R, G, and B signals, the interpolation processing unit 330 executes a color interpolation processing using the received R, G, and B signals, and transmits the R, G, and B signals after the processing to the gamma correction unit 340. Here, the color interpolation processing is a demosaicing processing. The demosaicing processing (color interpolation processing) is a known processing, and the detailed description thereof will be omitted.

Thus, the signal generation processing in Step S210 is completed.

The gamma correction unit 340 performs a gamma correction processing on the received R, G, and B signals, and transmits the R, G, and B signals after the processing to the image processor 500 (S220). The gamma correction processing is a known processing, and the detailed description thereof will be omitted.

The image processor 500 generates an image (frame) using the received R, G, and B signals (S400). Namely, the image processor 500 executes an image processing.

When a moving picture is taken by the imaging apparatus 1000, the image generation processing in FIG. 3 is repeatedly executed.

In the imaging apparatus 1000 according to the present embodiment, the color temperature of the light emitted from the light source is calculated, and the white balance coefficient according to the color temperature is calculated. Namely, the color temperature according to a photographed scene is calculated (determined), and the white balance coefficient is calculated (determined).

Next, a processing to calculate the color temperature and the white balance coefficient (hereinafter, referred to as an image correction information calculation processing) will be described. In the image correction information calculation processing, the control unit 200 is a calculation unit for calculating the color temperature and the like.

Figure 5:
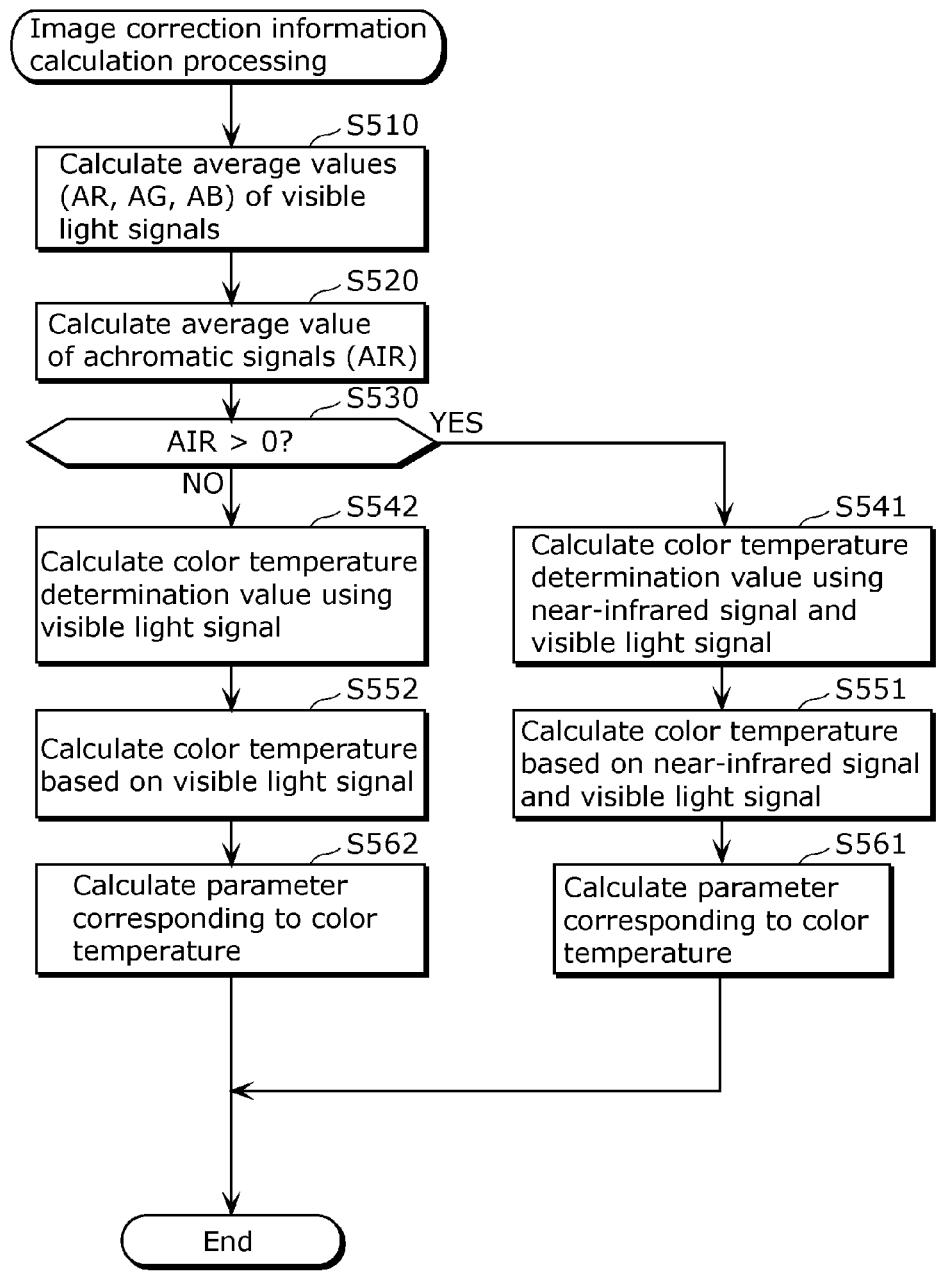
FIG. 5 is a flowchart showing an image correction information calculation processing.

FIG. 5 is a flowchart of the image correction information calculation processing. The image correction information calculation processing is executed by the control unit 200 every time when the control unit 200 receives the m sets of R, G, B, and IR signals corresponding to one frame from the color separation unit 310.

The R, G, B, and IR signals received by the control unit 200 are signals corrected using the color separation correction matrix in consideration of the spectrum or the like of the actual device (imaging device 100).

In Step S510, the average value of the visible light signals corresponding to one frame is calculated. Specifically, using the received m sets of the R, G, and B signals, the control unit 200 calculates the average value of the R signals, the average value of the G signals, and the average value of the B signals.

More specifically, first, the control unit 200 calculates the average value of m of the R values indicated by m of the R signal (hereinafter, referred to as an average red value AR). The control unit 200 also calculates the average value of m of the G values indicated by m of the G signals (hereinafter, referred to an average green value AG). The control unit 200 also calculates the average value of m of the B values indicated by m of the B signals (hereinafter, referred to as an average blue value AB).

In Step S520, the average value of achromatic signals (achromatic component) corresponding to one frame is calculated. Specifically, the control unit 200 calculates the average value of m of the IR values indicated by the received m of the IR signals (hereinafter, referred to as an average infrared value AIR).

Hereinafter, the average red value AR, the average green value AG, the average blue value AB, and the average infrared value AIR are also expressed as AR, AG, AB, and AIR, respectively.

In Step S530, it is determined whether the amount of the near-infrared signals (IR signals) corresponding to one frame is larger than a predetermined amount. Specifically, the control unit 200 determines whether the average infrared value AIR is larger than a predetermined threshold for determination. The threshold for determination is 0. Namely, in Step S530, it is determined whether the near-infrared light is included in the received light corresponding to one frame.

In Step S530, if YES, the processing goes to Step S541. When YES in Step S530, the amount of the near-infrared signals (IR signals) corresponding to one frame is larger than the predetermined amount.

Meanwhile, in Step S530, if NO, the processing goes to Step S542. When NO in Step S530, the average infrared value AIR is not more than the threshold for determination. Namely, when NO in Step S530, the amount of the near-infrared signals (IR signals) corresponding to one frame is not more than the predetermined amount. Namely, when NO in Step S530, the amount of the near-infrared signals (IR signals) is almost zero.

The threshold for determination is not limited to 0, and it may be a value close to 0. The threshold for determination may be a value of 1% of the maximum value of the IR value, for example. For example, when the IR value is a value in the range of 0 to 255, the threshold for determination is 3. In this case, when NO in Step S530, the average infrared value AIR≈0.

In Step S541, a color temperature determination value is calculated using the near-infrared signal and the visible light signal. The color temperature determination value is a value used for calculating the color temperature. Specifically, using the first and second visible light signals and the near-infrared signal, the color temperature determination value is calculated. The first visible light signal and the second visible light signal are signals obtained by photoelectrically converting the visible light, the visible light photoelectrically converted to the first visible light signal having a wavelength different from that of the visible light photoelectrically converted to the second visible light signal.

More specifically, the control unit 200 calculates the color temperature determination value by dividing the average infrared value AIR as the near-infrared signal by the average red value AR as the first visible light signal. In this case, the color temperature determination value is represented by AIR/AR. Namely, in this case, the color temperature determination value is a ratio of the near-infrared signal to the red-light signal as the first visible light signal.

Hereinafter, the ratio of the near-infrared signal to the first visible light signal is referred to as a first ratio. In this case, AIR/AR is the first ratio. The first ratio is not limited to AIR/AR. For example, the first ratio may be AIR/AG.

The control unit 200 calculates the color temperature determination value by dividing the average red value AR as the first visible light signal by the average green value AG as the second visible light signal. In this case, the color temperature determination value is represented by AR/AG. In this case, the color temperature determination value is the ratio of the red-light signal as the first visible light signal to the green-light signal as the second visible light signal.

Hereinafter, the ratio of the first visible light signal to the second visible light signal is referred to as a second ratio. In this case, AR/AG is the second ratio. The second ratio is not limited to AR/AG. For example, the second ratio may be AG/AB.

The color temperature determination value is not limited to the signal ratio. The color temperature determination value may be a difference between two values, for example.

In this case, as the color temperature determination value, the control unit 200 calculates the difference between the average red value AR as the first visible light signal and the average infrared value AIR as the near-infrared signal. When the difference is a negative value, the absolute value of the negative value is calculated as the color temperature determination value. In this case, the color temperature determination value is the difference between the red-light signal as the first visible light signal and the near-infrared signal.

Hereinafter, the difference between the first visible light signal and the near-infrared signal is referred to as a first difference. The difference between AR and AIR is the first difference. The first difference is not limited to the difference between AR and AIR. For example, the first difference may be the difference between AG and AIR.

As the color temperature determination value, the control unit 200 calculates the difference between the average red value AR as the first visible light signal and the average green value AG as the second visible light signal. When the difference is a negative value, the absolute value of the negative value is calculated as the color temperature determination value. In this case, the color temperature determination value is the difference between the first visible light signal and the second visible light signal.

Hereinafter, the difference between the first visible light signal and the second visible light signal is referred to as a second difference. The difference between AR and AG is the second difference. The second difference is not limited to the difference between AR and AG. For example, the second difference may be the difference between AG and AB.

Hereinafter, when the color temperature determination value is the first ratio or the first difference, the color temperature determination value is also referred to as a first color temperature determination value. Hereinafter, when the color temperature determination value is the second ratio or the second difference, the color temperature determination value is also referred to as a second color temperature determination value.

Even if the processing in Step S541 and a processing in Step S542 described later are executed in real time, the operation processing (division processing) may be executed at least for every frame. For this reason, the processings in Step S541 and S542 may be processed at a low speed at which one frame is processed.

In Step S551, the color temperature is calculated based on the near-infrared signal and the visible light signal. Specifically, the control unit 200 calculates the color temperature using the calculated color temperature determination value and comparison tables T100 and T200. The color temperature determination value refers to the first color temperature determination value and the second color temperature determination value. A specific method of calculating a color temperature will be described later. The comparison tables T100 and T200 are an LUT (Look up Table).

The comparison table T100 is a table showing the calculated first color temperature determination value and a plurality of determination values for comparison in association with a plurality of color temperatures. The respective color temperatures shown in the comparison table T100 are a color component value.

The comparison table T200 is a table showing the calculated second color temperature determination value and a plurality of determination values for comparison in association with a plurality of color temperatures. The respective color temperatures shown in the comparison table T200 are a color component value.

Figure 6:
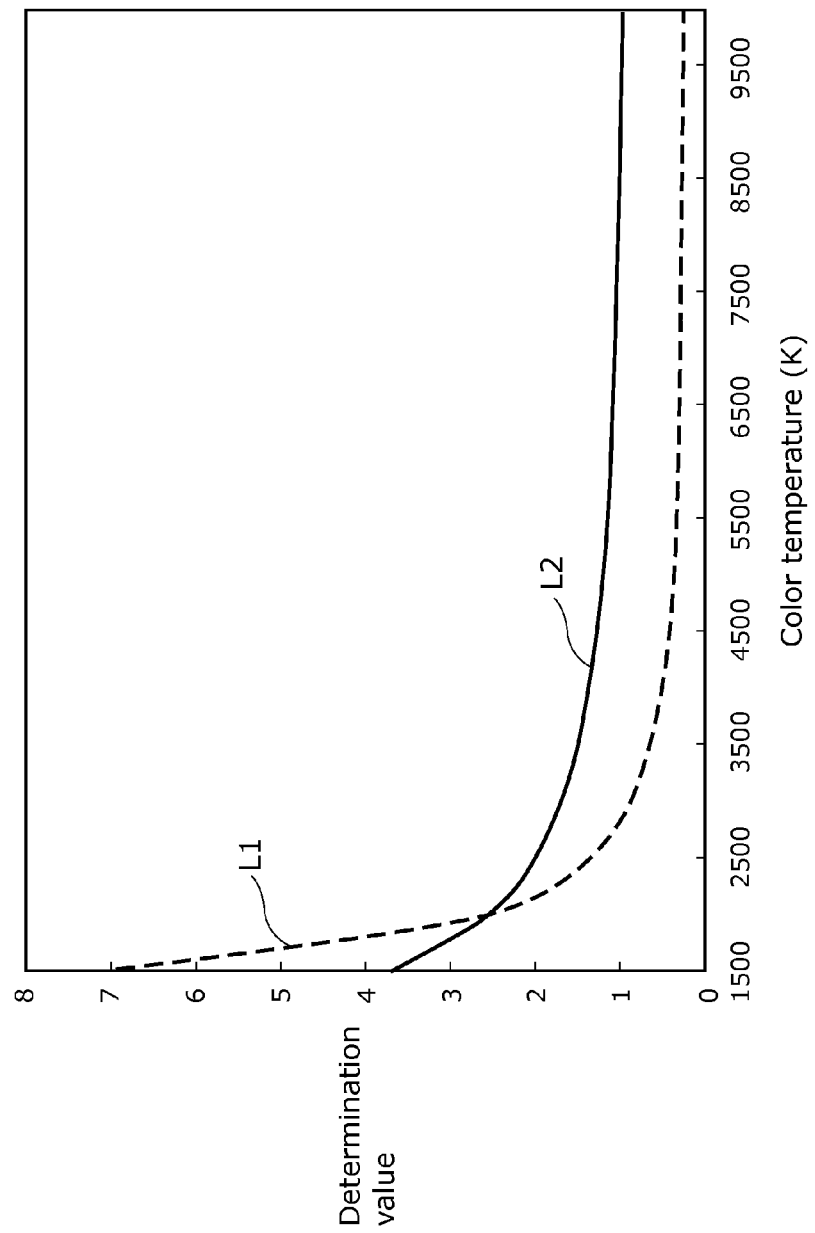
FIG. 6 is a drawing for describing a comparison table.

FIG. 6 is a drawing for describing the comparison table.

In FIG. 6, the abscissa designates the color temperature, and the ordinate designates the determination value. In FIG. 6, characteristic curves L1 and L2 are shown as an example.

The characteristic curve L1 is a characteristic curve corresponding to the comparison table T100. The comparison table T100 shows accurate color temperatures (color component values) corresponding to the respective determination values shown by the characteristic curve L1. The color temperature (color component value) corresponding to each determination value shown by the characteristic curve L1 is an accurate color temperature determined empirically by simulation using an xy chromaticity diagram or the like, for example.

When the first color temperature determination value is the first ratio, the comparison table T100 is a table showing the first ratio and information for calculating a color temperature corresponding to the first ratio.

For example, suppose that a plurality of determination values shown in the comparison table T100 is the first color temperature determination value and the value for comparison, and the first color temperature determination value is AIR/AR as an example. In this case, the color temperatures (color component values) corresponding to the respective determination values shown in the comparison table T100 are determined empirically by simulation or the like such that the color temperatures accurately correspond to the respective values represented by AIR/AR.

When the first color temperature determination value is the first difference, the comparison table T100 is a table showing the first difference and information for calculating a color temperature corresponding to the first difference. For example, suppose that a plurality of determination values shown in the comparison table T100 is the first color temperature determination value and the value for comparison, and the first color temperature determination value is the difference between AR and AIR as an example. In this case, the color temperatures (color component values) corresponding to the respective determination values shown in the comparison table T100 are determined empirically by simulation or the like such that the color temperatures accurately correspond to the respective values as the difference between AR and AIR.

The shape of the characteristic curve L1 is different between the case where the first color temperature determination value is AIR/AR and the case where the first color temperature determination value is the difference between AR and AIR.

The characteristic curve L2 is a characteristic curve corresponding to the comparison table T200. The comparison table T200 shows accurate color temperatures (color component values) corresponding to the respective determination values shown by the characteristic curve L2. The color temperature (color component value) corresponding to each determination value shown by the characteristic curve L2 is an accurate color temperature determined empirically by simulation using an xy chromaticity diagram or the like, for example.

For example, suppose that a plurality of determination values shown in the comparison table T200 is the second color temperature determination value and the value for comparison, and the second color temperature determination value is AR/AG as an example. In this case, the color temperatures (color component values) corresponding to the respective determination values shown in the comparison table T200 are determined empirically by simulation or the like such that the color temperatures accurately correspond to the respective values represented by AR/AG.

For example, suppose that a plurality of determination values shown in the comparison table T200 is the second color temperature determination value and the value for comparison, and the second color temperature determination value is the difference between AR and AG as an example. In this case, the color temperatures (color component values) corresponding to the respective determination values shown in the comparison table T200 are determined empirically by simulation or the like such that the color temperatures accurately correspond to the respective values as the difference between AR and AG.

The shape of the characteristic curve L2 is different between the case where the second color temperature determination value is AR/AG and the case where the second color temperature determination value is the difference between AR and AG.

Again, referring to FIG. 5, in Step S551, among the plurality of determination values shown in the comparison table T100, the control unit 200 extracts the color temperature (color component value) corresponding to the determination value closest to the calculated first color temperature determination value, and calculates the extracted color temperature as a first color temperature.

Here, suppose that the first color temperature determination value is the first ratio as an example. In this case, in the calculation of the first color temperature, among the plurality of determination values shown in the comparison table T100, the control unit 200 calculates the color temperature (color component value) corresponding to the determination value closest to the calculated first ratio as the first color temperature.

Here, suppose that the first color temperature determination value is the first difference as an example. In this case, in the calculation of the first color temperature, among the plurality of determination values shown in the comparison table T100, the control unit 200 calculates the color temperature (color component value) corresponding to the determination value closest to the calculated first difference as the first color temperature.

Among the plurality of determination values shown in the comparison table T200, the control unit 200 extracts the color temperature (color component value) corresponding to the determination value closest to the calculated second color temperature determination value, and calculates the extracted color temperature as a second color temperature.

Here, suppose that the second color temperature determination value is the second ratio as an example. In this case, in the calculation of the second color temperature, among the plurality of determination values shown in the comparison table T200, the control unit 200 calculates the color temperature (color component value) corresponding to the determination value closest to the calculated second ratio as the second color temperature.

Here, suppose that the second color temperature determination value is the second difference as an example. In this case, in the calculation of the second color temperature, among the plurality of determination values shown in the comparison table T200, the control unit 200 calculates the color temperature (color component value) corresponding to the determination value closest to the calculated second difference as the second color temperature.

Subsequently, the control unit 200 calculates the average value of the first color temperature and the second color temperature as a color temperature of a calculation target (hereinafter, referred to a color temperature to be calculated).

Namely, when the first color temperature determination value is the first ratio and the second color temperature determination value is the second ratio, in Step S551, the control unit 200 (calculation unit) calculates the color temperature using the calculated ratio among the first ratio and the second ratio and the comparison table showing the information for calculating a color temperature corresponding to the calculated ratio.

Alternatively, when the first color temperature determination value is the first difference and the second color temperature determination value is the second difference, in Step S551, the control unit 200 (calculation unit) calculates the color temperature using the calculated difference among the first difference and the second difference and the comparison table showing the information for calculating a color temperature corresponding to the calculated difference.

Namely, when the amount of the near-infrared signal is larger than the predetermined amount (YES in S530), according to the processing in Step S551, the control unit 200 (calculation unit) calculates the color temperature using the first ratio and the comparison table showing the information for calculating a color temperature corresponding to the first ratio.

Alternatively, when the amount of the near-infrared signal is larger than the predetermined amount (YES in S530), according to the processing in Step S551, the control unit 200 (calculation unit) calculates the color temperature using the first difference and the comparison table showing the information for calculating a color temperature corresponding to the first difference.

In other words, when the amount of the near-infrared signal is larger than the predetermined amount (YES in S530), according to the processings in Steps S541 and S551, the control unit 200 (calculation unit) calculates the color temperature using at least the first visible light signal and the near-infrared signal.

Moreover, according to the processings in Step S541 and S551, the control unit 200 (calculation unit) calculates the color temperature using at least two of the first visible light signal, the second visible light signal, and the near-infrared signal.

The method of calculating the color temperature to be calculated is not limited to the method above. For example, the color temperature to be calculated may be a mean square of the first color temperature and the second color temperature.

Alternatively, the color temperature to be calculated may be a first color temperature or the second color temperature but not the value calculated using the first color temperature and the second color temperature. Namely, for example, the color temperature to be calculated may be calculated using the comparison table T100 and the first color temperature determination value without using the comparison table T200 and the second color temperature determination value. In this case, in Step S551, the first color temperature is calculated as described above. The calculated first color temperature may be calculated as the color temperature to be calculated.

In Step S561, an image processing parameter corresponding to the color temperature is calculated. Specifically, as an image processing parameter, the control unit 200 calculates the white balance coefficient WB corresponding to the obtained color temperature to be calculated. The method for calculating the white balance coefficient WB using the color temperature is a known method, and the detailed description thereof will be omitted.

Subsequently, the control unit 200 transmits the calculated white balance coefficient WB to the white balance unit 320.

The image processing parameter means all the parameters needed for the image processing such as the white balance coefficient WB, a correction matrix coefficient, and a color adjustment coefficient. Description of a method of calculating the image processing parameter other than the white balance coefficient WB (for example, color adjustment coefficient) will be omitted.

Then, the image correction information calculation processing is completed.

If NO in Step S530, namely, when the amount of the near-infrared signal (IR signal) corresponding to one frame is not more than the predetermined amount, the processing goes to Step S542.

In Step S542, the color temperature determination value is calculated using the visible light signal. A method of calculating a color temperature determination value is the same as the method of calculating the second color temperature determination value in Step S541, and the detailed description thereof will be omitted. Hereinafter, the method will be simply described.

The control unit 200 calculates the color temperature determination value (second color temperature determination value) by dividing the average red value AR as the first visible light signal by the average green value AG as the second visible light signal.

In this case, the second color temperature determination value is represented by AR/AG. Namely, the second color temperature determination value is the ratio (second ratio) of the red-light signal as the first visible light signal to the green-light signal as the second visible light signal.

The second color temperature determination value is not limited to the signal ratio. For example, the second color temperature determination value is a difference between two values. In this case, the control unit 200 calculates the difference between the average red value AR as the first visible light signal and the average green value AG as the second visible light signal as the second color temperature determination value. When the difference is a negative value, the absolute value of the negative value is calculated as the second color temperature determination value. In this case, the second color temperature determination value is the difference between the first visible light signal and the second visible light signal (second difference).

In Step S552, the color temperature is calculated based on the visible light signal. The processing in Step S552 is the same as the processing to calculate the second color temperature in Step S551, and the detailed description thereof will be omitted.

Hereinafter, the processing in Step S552 will be simply described. The control unit 200 calculates the color temperature using the calculated second color temperature determination value and the comparison table T200. The comparison table T200 has been described above, and the detail description will be omitted.

More specifically, among the plurality of determination values shown in the comparison table T200, the control unit 200 extracts the color temperature (color component value) corresponding to the determination value closest to the calculated second color temperature determination value, and calculates the extracted color temperature as a color temperature of a calculation target (color temperature to be calculated).

In Step S562, the same processing as that in Step S561 is executed, and the detailed description thereof will be omitted.

Then, the image correction information calculation processing is completed.

Comparative Example

Hereinafter, an imaging apparatus according to Comparative Example of the embodiment according to the present invention (hereinafter, referred to as an imaging apparatus N) will be described. The imaging apparatus N calculates the color temperature using only the visible light. An imaging condition causing deficits exists when the imaging apparatus N receives the visible light and the near-infrared light simultaneously and performs processing.

For example, suppose that the imaging apparatus N calculates the B signal by removing the IR signal component from the B+IR signal, and calculates the R signal by removing the IR signal component from the R+IR signal. In this case, particularly, when the color temperature of the light received by the imaging apparatus N is a low color temperature in the range of 1500 K to 2500 K, the amount of the B signal to the amount of the IR signal is extremely small. For this reason, accuracy of the signal of an image generated by the imaging apparatus N, namely, an SN (Signal-to-Noise) ratio is reduced.

Figure 7:
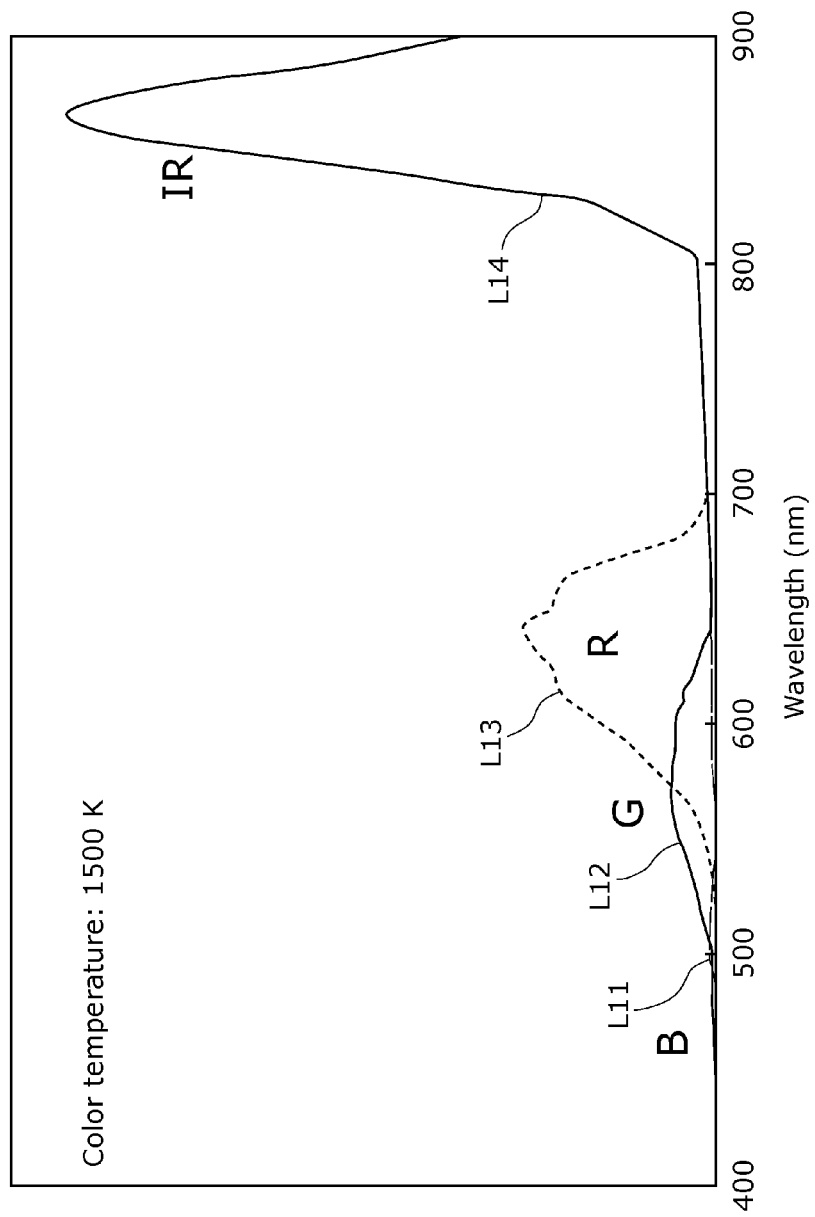
FIG. 7 is a drawing showing a variety of properties in illumination light at a color temperature of 1500 K.
Figure 8:
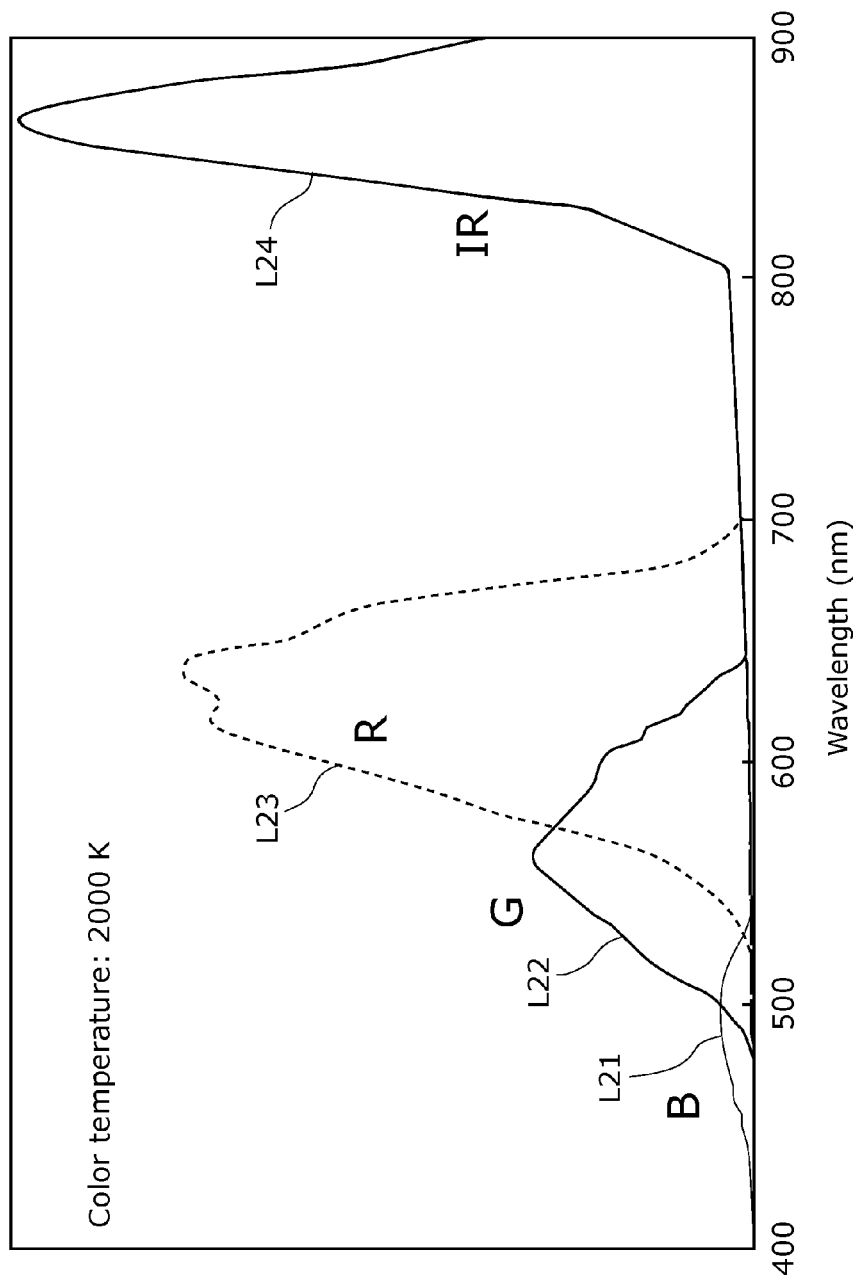
FIG. 8 is a drawing showing a variety of properties in illumination light at a color temperature of 2000 K.
Figure 9:
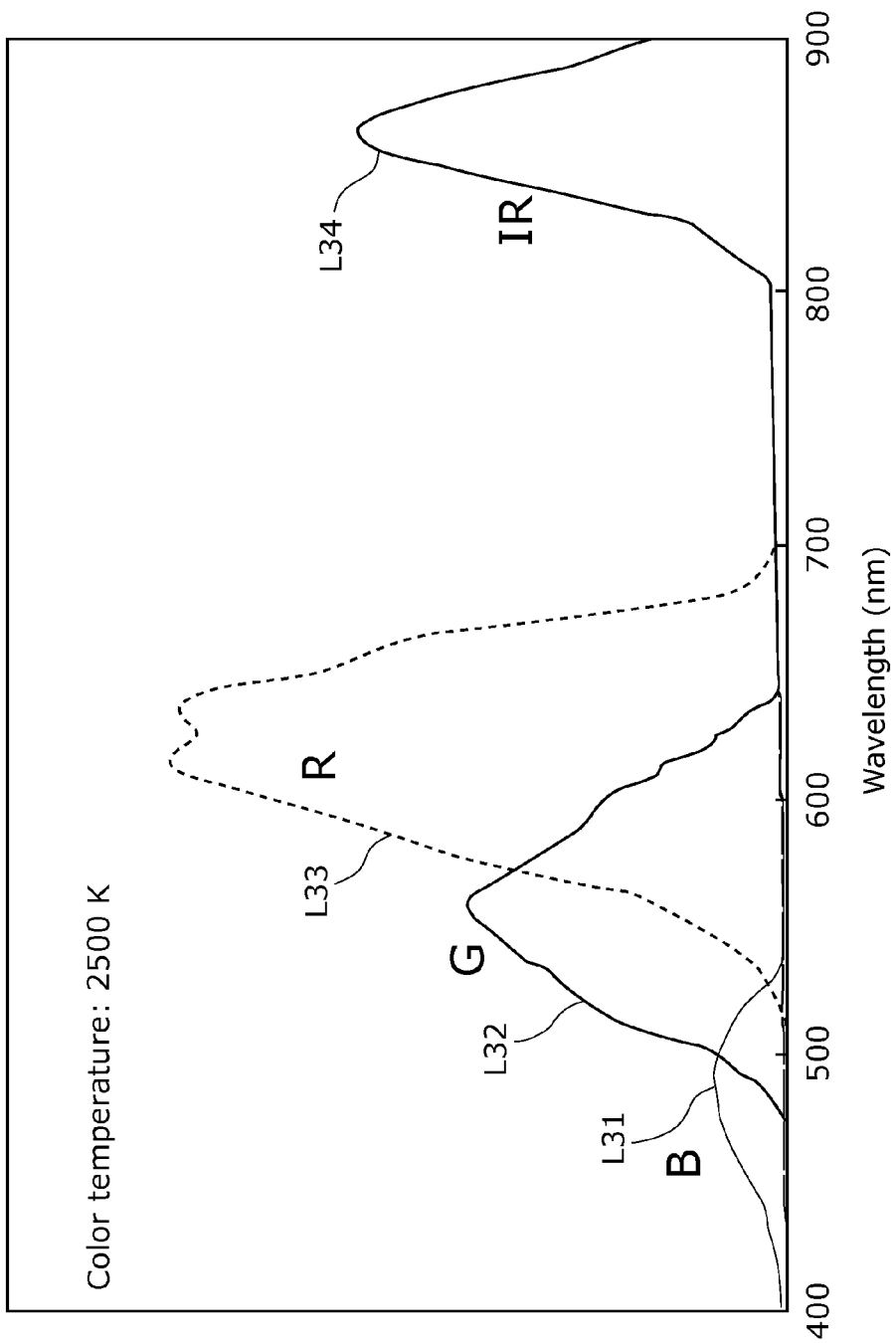
FIG. 9 is a drawing showing a variety of properties in illumination light at a color temperature of 2500 K.

FIGS. 7, 8, and 9 each show a spectrum of a product of spectral sensitivity of a color solid-state imaging device (photoelectric converting element) and intensity of illumination in illumination light (light) whose color temperature is 1500 K, 2000 K, or 2500 K. In FIGS. 7 to 9, the ordinate shows a product of the spectral sensitivity of the photoelectric converting element and the intensity of the illumination light, and the abscissa shows the wavelength of the illumination light.

FIG. 7 is a drawing showing a variety of properties in the illumination light whose color temperature is 1500 K.

FIG. 8 is a variety of properties in the illumination light whose color temperature is 2000 K.

FIG. 9 is a variety of properties in the illumination light whose color temperature is 2500 K.

In FIGS. 7, 8, and 9, characteristic curves L11, L21, and L31 each show a product of the spectral sensitivity of a photoelectric converting element SP2 and the intensity of the illumination light over the range of wavelength of 400 to 900 nm, the photoelectric converting element SP2 generating the B+IR signal In FIGS. 7, 8, and 9, characteristic curves L12, L22, and L32 each show a product of the spectral sensitivity of a photoelectric converting element SP3 and the intensity of the illumination light over the range of wavelength of 400 to 900 nm, the photoelectric converting element SP3 generating the G+IR signal.

In FIGS. 7, 8, and 9, characteristic curves L13, L23, and L33 each show a product of the spectral sensitivity of a photoelectric converting element SP1 and the intensity of the illumination light over the range of wavelength of 400 to 900 nm, the photoelectric converting element SP1 generating the R+IR signal.

In FIGS. 7, 8, and 9, characteristic curves L14, L24, and L34 each show a product of the spectral sensitivity of a photoelectric converting element SP4 and the intensity of the illumination light over the range of wavelength of 400 to 900 nm, the photoelectric converting element SP4 generating the IR signal.

As remarkable in FIG. 7, it is found that the sensitivity of the blue light is extremely lower than that of the other light (green light, red light, and IR light). When the color temperature is calculated using the blue-light signal under such an illumination, the accuracy of the calculated color temperature is very low, causing problems such that the white balance cannot be adjusted correctly.

Moreover, when the color temperature is calculated only by weighing the signals of three primary colors including the visible light and the near-infrared light differently depending on the three primary colors, color separation itself is difficult under the illumination at a low color temperature in which the ratio of the near-infrared light is large. For this reason, the calculation method is not suitable for a color image.

Even if each of the primary colors is multiplied by a different gain to reproduce a correct color of an image, a color different from an original color is reproduced in objects having different reflectances in the near-infrared range. For this reason, color reproduction to reproduce a correct color is difficult.

Meanwhile, in the imaging apparatus 1000 according to the present embodiment, when the amount of the near-infrared signal is larger than the predetermined amount, the color temperature of the received light is calculated using the near-infrared signal and the visible light signal. As the light has a lower color temperature, the component of the near-infrared light is larger. For this reason, in the present embodiment, the near-infrared signal is used even under an environment at a low color temperature such as under the illumination light or the like. Accordingly, the color temperature can be calculated with high accuracy. For this reason, the white balance can be adjusted based on the color temperature with high accuracy.

As the light has a lower color temperature, the light includes a larger amount of the near-infrared light. Accordingly, when the light received by the imaging apparatus 1000 has a low color temperature, the amount of the near-infrared signal is larger than the predetermined amount. For this reason, the imaging apparatus 1000 calculates the color temperature using the near-infrared light (near-infrared signal). Namely, according to the present embodiment, reduction in the accuracy in calculation of the color temperature can be suppressed irrespective of the state of the visible light received by the imaging device 100.

Moreover, according to the processing in Step S530 in FIG. 5, it is determined whether the received light includes the near-infrared light. When no near-infrared light is included, the color temperature is calculated using the visible light signal. Thereby, an error in determination of the color temperature can be avoided (prevented).

Namely, presence/absence of the near-infrared light is determined, and the color temperature is calculated using only the ratio of the visible light under the illumination including no near-infrared light such as a fluorescent lamp. Thereby, an error in determination of the color temperature can be avoided.

(Summary)

As above, in the imaging apparatus 1000 according to the embodiment of the present invention, the plurality of pixels having sensitivity to the visible light to near-infrared light is arranged. The plurality of color filters is disposed on the plurality of pixels, respectively.

Among the plurality of color filters, at least one color filter transmits at least the visible light and the near-infrared light. Among the plurality of color filters, the color filter and other color filter transmit the near-infrared light at substantially the same wavelength region. Namely, the other color filter transmits the light of substantially the same near-infrared component.

The imaging apparatus 1000 detects (calculates) the color temperature by evaluating (calculating) the ratio of the near-infrared light signal to the visible light signal or the difference therebetween.

Namely, when the signal of the visible light and the near-infrared light are used, the signal of the near-infrared light is relatively larger as the color temperature of the light is lower. For this reason, the reference color temperature for the respective color temperatures is determined empirically. Thereby, the color temperature can be determined.

In the related art, the color temperature is determined using only the visible light. In the imaging apparatus 1000 according to the present embodiment, however, the color temperature is determined using a signal of the visible light to the near-infrared light. For this reason, a wider range of the wavelength can be determined, and the accuracy of the color temperature to be determined (calculated) can be improved.

Moreover, in the imaging apparatus 1000 according to the present embodiment, the color temperature is detected (calculated) using the ratio of the near-infrared light signal to the visible light signal or the difference therebetween, and the ratio of two different visible light signals or the difference therebetween.

Thereby, as the signal for calculating the color temperature, the near-infrared light signal and the visible light signal are relatively compared, and in addition, the visible light signals of the lights at different wavelengths are also relatively compared. Thereby, the material for determination to calculate the color temperature is increased. As a result, the color temperature can be determined (calculated) stably with high accuracy.

Moreover, in the imaging apparatus 1000 according to the present embodiment, the color temperature is detected (calculated) by evaluating (using) the ratio of the near-infrared light to the red-light signal or the difference therebetween, and the ratio of the red-light signal to the green-light signal or the difference therebetween.

When the light has a low color temperature, only a small amount of the blue-light signal is available, causing a great error. Considering this, the ratio of the near-infrared light to the red-light signal or the difference therebetween and the ratio of the red-light signal to the green-light signal or the difference therebetween are evaluated (used). Namely, by use of the green component, the red component, and the near-infrared component as the signal other than the blue-light signal, the color temperature can be determined (calculated) stably with fluctuation due to an error being reduced.

Moreover, the image processing is executed using the color temperature calculated according to the present embodiment. Thereby, the parameters of the white balance processing and the parameters of the correction matrix processing at the respective color temperatures can be individually held in a memory, thus providing an imaging apparatus that can output a proper image under various illuminations by using the color temperature of the illumination.

Here, the parameters needed for the image processing mean all the parameters needed for the image processing such as the white balance, the correction matrix coefficient, and the color adjustment coefficient.

(Functional Block Diagram)

Figure 10:
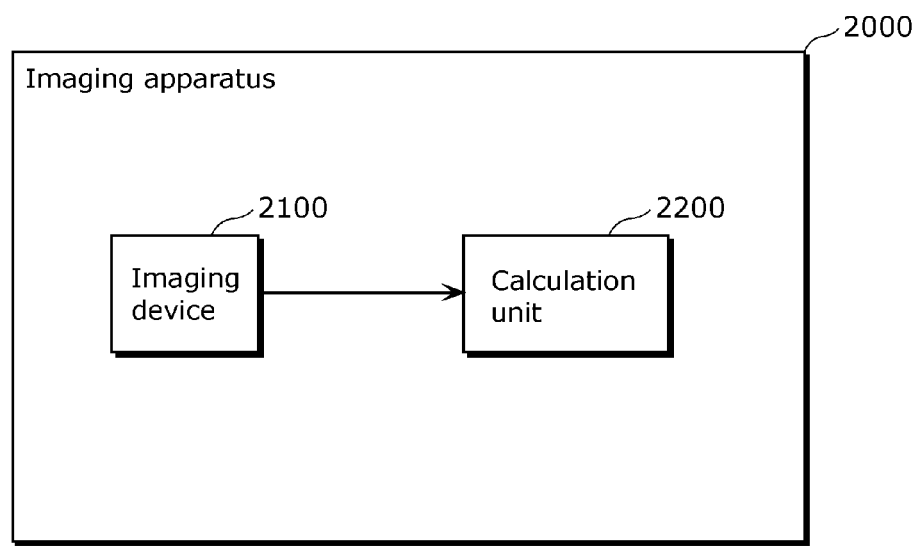
FIG. 10 is a block diagram showing a functional configuration characteristic to the imaging apparatus.

FIG. 10 is a block diagram showing a functional configuration characteristic to an imaging apparatus 2000. The imaging apparatus 2000 corresponds to the imaging apparatus 1000. Namely, FIG. 10 is a block diagram showing main functions of the present invention among the functions that the imaging apparatus 1000 has.

The imaging apparatus 2000 functionally includes an imaging device 2100 and a calculation unit 2200.

The imaging device 2100 is an imaging device for receiving the visible light and the near-infrared light. The imaging device 2100 corresponds to the imaging device 100. The calculation unit 2200 calculates the color temperature.

The imaging device 2100 includes a first photoelectric converting element and a second photoelectric converting element.

The first photoelectric converting element is an element for photoelectrically converting the visible light transmitted through a first color filter to generate a first visible light signal as a visible light signal, the color filter transmitting at least the visible light.

The first photoelectric converting element corresponds to one of the photoelectric converting elements SP1, SP2, and SP3 in FIG. 2. The first color filter corresponds to one of the color filters CF1, CF2, and CF3 in FIG. 2. For example, when the first color filter is the color filter CF1, the first visible light signal is the red-light signal.

The second photoelectric converting element is an element for photoelectrically converting the near-infrared light transmitted through a second color filter to generate a near-infrared signal, the second color filter transmitting at least the near-infrared light. The second photoelectric converting element corresponds to the photoelectric converting element SP4. The second color filter corresponds to the color filter CF4 in FIG. 2. The near-infrared signal corresponds to the IR signal.

When the amount of the near-infrared signal is larger than a predetermined amount, the calculation unit 2200 calculates the color temperature using at least the first visible light signal and the near-infrared signal. The calculation unit 2200 corresponds to, for example, the control unit 200 that executes the processing in Step S551 in FIG. 5.

The calculation unit 2200 included in the imaging apparatus 2000 may be configured as hardware such as an LSI. Alternatively, the calculation unit 2200 may be a module of a program executed by a processor such as a CPU.

As above, the imaging apparatus 1000 according to the present invention has been described based on the embodiment, but the present invention will not be limited to the embodiment. The scope of the present invention includes a variety of modifications of the present embodiment made by persons skilled in the art or embodiments formed with a combination of components in different embodiments as long as those are not departed from the gist of the present invention.

Moreover, all or part of the components that form the imaging apparatus 1000 may be formed as hardware. Alternatively, all or part of the components that form the imaging apparatus 1000 may be a module of a program executed by a CPU and the like.

Alternatively, all or part of the components that form the imaging apparatus 1000 may be formed of a single system LSI. The system LSI is an ultra multifunctional LSI produced by integrating a plurality of components on a single chip. Specifically, the system LSI is a computer system including a microprocessor, a read only memory (ROM), a random access memory (RAM), and the like.

For example, in FIG. 1, the signal processing unit 300 may be formed of a single system LSI.

Alternatively, the present invention may be implemented as a method of calculating a color temperature, the method including the steps corresponding to components included in the imaging apparatus 1000. Alternatively, the present invention may be implemented as a program for causing a computer to execute the steps of the method of calculating a color temperature.

Namely, the present invention may be implemented as software for causing a microcomputer, a CPU, and the like to execute the steps according to an ordinary algorithm.

Moreover, the method of calculating a color temperature according to the present invention corresponds to all or part of the image correction information calculation processing in FIG. 5 (for example, Steps S530 to S562). The method of calculating a color temperature according to the present invention does not always need to include all the corresponding steps in FIG. 5. Namely, the method of calculating a color temperature according to the present invention may include the minimal steps that can provide the effect of the present invention. Here, the minimal steps that can provide the effect of the present invention are, for example, Steps S530 and S551.

Alternatively, the present invention may be implemented as the steps executed by hardware such as an Application Specific Integrated Circuit (ASI), a Field Programmable Gate Array (FPGA), a Digital Signal Processor (DSP), and the like using a programming language such as a Register Transfer Language (RTL).

Alternatively, the present invention may be implemented as a computer-readable recording medium that stores such a program. Moreover, the program may be delivered via a transmission medium such as the Internet.

The embodiment disclosed here is only one example with all respects, and should not be construed to limit the present invention. It is intended that the scope of the present invention is specified by the scope of claims not by the description above, and meaning equivalent to the scope of claims and all modifications within the scope are included.

Although only one exemplary embodiment of the present invention has been described in detail above, those skilled in The art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applied to an imaging apparatus that can suppress reduction in accuracy in calculation of the color temperature.

The invention claimed is:

1. An imaging apparatus comprising:
an imaging device that receives visible light and near-infrared light; and
a calculation unit configured to calculate a color temperature,
wherein the imaging device includes:
a first photoelectric converting element that photoelectrically converts visible light transmitted through a first color filter to generate a first visible light signal as a visible light signal, the first color filter transmitting at least the visible light;
a second photoelectric converting element that photoelectrically converts near-infrared light transmitted through a second color filter to generate a near-infrared signal, the second color filter transmitting at least the near-infrared light;
a third photoelectric converting element that photoelectrically converts visible light transmitted through a third color filter to generate a second visible light signal as a visible light signal, the third color filter transmitting the visible light having a wavelength different from a wavelength of the visible light transmitted by the first color filter,
the calculation unit is configured to calculate a second ratio, the second ratio being calculated by dividing the first visible light signal by the second visible light signal, when an amount of the near-infrared signal is not more than a predetermined amount, and
the calculation unit is configured to calculate the color temperature based on the second ratio.

2. The imaging apparatus according to claim 1,
wherein the calculation unit is configured to calculate a first ratio, the first ratio being calculated by dividing the near-infrared signal by the first visible light signal, when the amount of the near-infrared signal is larger than the predetermined amount, and
the calculation unit is configured to calculate the color temperature using the first ratio and a comparison table showing information for calculating a color temperature corresponding to the first ratio.

3. The imaging apparatus according to claim 1,
wherein the visible light transmitted through the first color filter is light of a red component, and
the first visible light signal is a red-light signal.

4. The imaging apparatus according to claim 1,
wherein
the calculation unit is configured to calculate the color temperature using the second ratio and a comparison table showing information for calculating a color temperature corresponding to the second ratio.

5. The imaging apparatus according to claim 4,
wherein the calculation unit is configured to calculate a first ratio as a ratio of the near-infrared signal to the first visible light signal when the amount of the near-infrared signal is larger than the predetermined amount, and
the calculation unit is configured to calculate the color temperature using the first ratio and a comparison table showing information for calculating a color temperature corresponding to the first ratio.

6. The imaging apparatus according to claim 1,
wherein the visible light transmitted through the first color filter is light of a red component,
the visible light transmitted through the third color filter is light of a green component,
the first visible light signal is a red-light signal, and
the second visible light signal is a green-light signal.

7. An imaging apparatus comprising:
an imaging device that receives visible light and near-infrared light; and
a calculation unit configured to calculate a color temperature,
wherein the imaging device includes:
a first photoelectric converting element that photoelectrically converts visible light transmitted through a first color filter to generate a first visible light signal as a visible light signal, the first color filter transmitting at least the visible light;
a second photoelectric converting element that photoelectrically converts near-infrared light transmitted through a second color filter to generate a near-infrared signal, the second color filter transmitting at least the near-infrared light; and
a third photoelectric converting element that photoelectrically converts visible light transmitted through a third color filter to generate a second visible light signal as a visible light signal, the third color filter transmitting the visible light having a wavelength different from a wavelength of the visible light transmitted by the first color filter,
the calculation unit is configured to calculate a second difference as a difference between the first visible light signal and the second visible light signal when an amount of the near-infrared signal is not more than a predetermined amount, and
the calculation unit is configured to calculate the color temperature based on the second difference.

8. The imaging apparatus according to claim 7,
wherein the calculation unit is configured to calculate a first difference as a difference between the first visible light signal and the near-infrared signal when the amount of the near-infrared signal is larger than the predetermined amount, and
the calculation unit is configured to calculate the color temperature using the first difference and a comparison table showing information for calculating a color temperature corresponding to the first difference.

9. The imaging apparatus according to claim 7,
wherein the calculation unit is configured to calculate the color temperature using the second difference and a comparison table showing information for calculating a color temperature corresponding to the second difference.

10. The imaging apparatus according to claim 9,
wherein the calculation unit is configured to calculate a first difference as a difference between the first visible light signal and the near-infrared signal when the amount of the near-infrared signal is larger than the predetermined amount, and
the calculation unit is configured to calculate the color temperature using the first difference and a comparison table showing information for calculating a color temperature corresponding to the first difference.

11. The imaging apparatus according to claim 7,
wherein the visible light transmitted through the first color filter is light of a red component, and
the first visible light signal is a red-light signal.

12. The imaging apparatus according to claim 7,
wherein the visible light transmitted through the first color filter is light of a red component,
the visible light transmitted through the third color filter is light of a green component,
the first visible light signal is a red-light signal, and
the second visible light signal is a green-light signal.

* * * * *